United States Patent [19]

Bertrand et al.

[11] 4,425,006

[45] Jan. 10, 1984

[54] SPEED REDUCER CONTROL DEVICE FOR A VEHICLE HAVING TWO INDEPENDENT PRESSURIZED FLUID BRAKING CIRCUITS

[75] Inventors: Philippe Bertrand, Maisons-Lafitte; Jean-Pierre Machillot, Saint-Gratien, both of France

[73] Assignee: Labavia S.G.E., Bois D'Arcy, France

[21] Appl. No.: 251,228

[22] Filed: Apr. 6, 1981

[30] Foreign Application Priority Data

Apr. 11, 1980 [FR] France ................. 80 08227

[51] Int. Cl.³ ............................. B60T 8/02
[52] U.S. Cl. .................... 303/3; 303/6 R; 303/96; 303/22 R
[58] Field of Search ........... 188/181, 195, 156, 267; 303/6, 50, 52, 91, 92, 93, 94, 96, 98, 100, 113–119, 20, 102, 22 R, 7, 8, 97, 99, 95, 103, 104, 2, 3, 6 R, 15–17; 310/93, 268; 180/282, 271, 283, 285, 197, 14, 167–179; 335/103, 136, 266; 192/4 A, 1, 2

[56] References Cited

U.S. PATENT DOCUMENTS

| 3,756,661 | 9/1973 | Michellone | 303/118 X |
| 3,956,722 | 5/1976 | Lagarde | 335/103 |
| 4,164,987 | 8/1979 | Lagarde | 180/271 |
| 4,260,199 | 4/1981 | Reinecke | 303/96 |
| 4,352,405 | 10/1982 | Marandet | 180/282 |

FOREIGN PATENT DOCUMENTS 340790 4/1974 Austria .
1590005 4/1970 France .
2336284 7/1977 France .

OTHER PUBLICATIONS

WABCO WESTINGHOUSE, edition Dec. 1974, No. 973.002, "Valve de Commande de Remorque".
BENDIX, "Trailer Control Valve (Predominance Type)", Technical Pamphlet 9/015, Issue 1, 9/82.

*Primary Examiner*—Douglas C. Butler
*Attorney, Agent, or Firm*—Stevens, Davis, Miller & Mosher

[57] ABSTRACT

The energization of the electric speed reducer of a vehicle, whose friction brakes for the front wheels and rear wheels are respectively controlled by two independent pressurized fluid circuits, is controlled by a plurality of pressure contacts. These pressure contacts are actuated by the pressure of a fluid and this pressure is permanently given a value tied to the higher of the two pressures existing in the two independent pressurized fluid circuits. A dual control relay valve of the + + type is connected to these two circuits and to an independent source of pressurized fluid.

8 Claims, 1 Drawing Figure

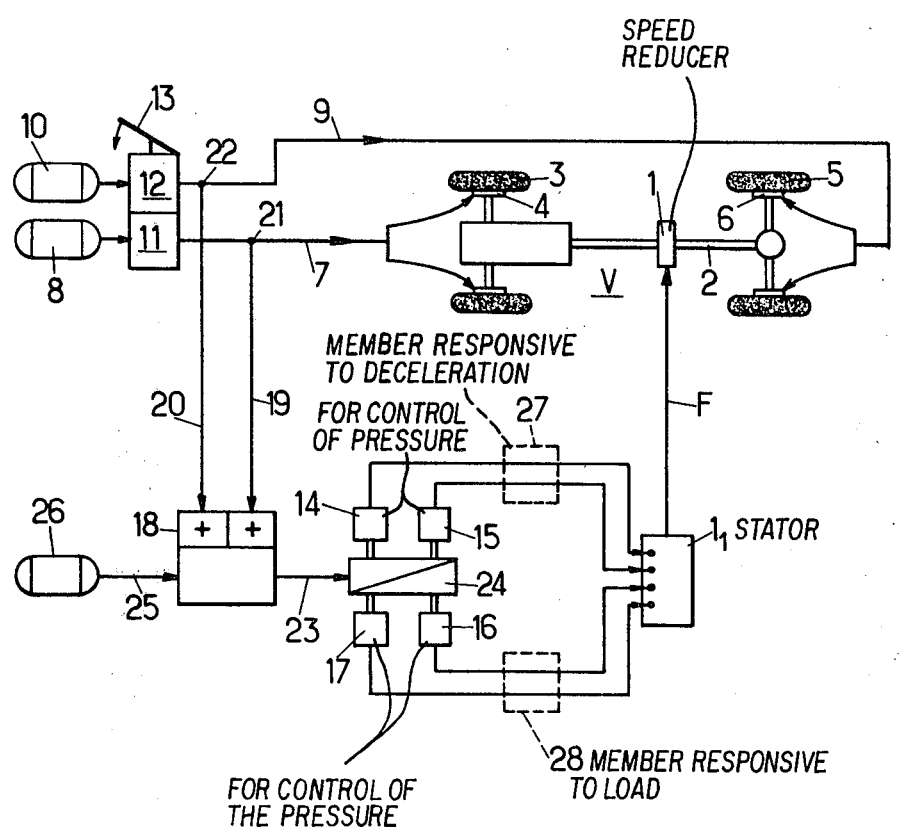

SPEED REDUCER CONTROL DEVICE FOR A VEHICLE HAVING TWO INDEPENDENT PRESSURIZED FLUID BRAKING CIRCUITS

The invention relates to devices for controlling speed reducers or retarders, particularly of the electric type. These devices are mounted on vehicles fitted with friction brakes which are remotely controlled from a pedal by means of a pressurized fluid.

The invention relates more particularly to control devices which are fitted to vehicles having two independent pressurized fluid circuits for safety reasons. These independent circuits control friction brakes mounted on two separate wheel trains of the vehicle, particularly on the front train and on the rear train of the vehicle. The friction brakes on both of these trains are controlled simultaneously by means of the same pedal.

It is known to control the energization of such a speed reducer with such a pedal by causing the pedal to actuate microswitches during a first part of its travel when depressed.

This technique, however often leads to unacceptable variations in control because it is difficult to accurately and durably adjust the actuation of the microswitches with a vehicle brake pedal. This problem results because the brake pedal has considerable play and is subjected to intense and repeated impact.

It has been proposed to control the energization of a speed reducer, as described above, by using the pressure which exists in one of the fluid circuits controlling the friction braking.

This solution provides a relatively accurate and durable control of the speed reducer, but has the disadvantage of requiring that the braking circuit being actuated is in good condition. Consequently, damage to this circuit is more detrimental because such damage not only causes the suppression of the friction braking of the wheel train, but also puts the speed reducer out of service.

The present invention overcomes these different disadvantages.

The vehicle speed reducer control device, in accordance with the invention, comprises pressure contacts mounted in a known manner to energize the speed reducer with an adjustable intensity depending on the control pressure of a fluid and means adapted to automatically supply at any time, control pressure at a value linked to the higher of the two pressures existing in the two braking circuits of the vehicle, at that time.

In accordance with the invention, if the two braking circuits in question operate normally, the speed reducer will be controlled by the pressure reigning in any one of these two circuits. However, if any one of these braking circuits is defective, the speed reducer is automatically controlled by the pressure existing in the other circuit.

In the preferred embodiments, one or more of the following arrangements can be utilized:

the means for adjusting the control pressure comprises a dual control relay valve, particularly of type + +, two inputs of which are connected respectively to the two friction braking circuits, the other input of which is connected to pressurized fluid source and an output of which is connected to the pressure contacts, the control of the speed reducer results in the successive energization of n stages corresponding to increasing speed reducing torques when the control pressure increases from its minimum value to its maximum value, means are provided for automatically neutralizing at least one energizing stage of the speed reducer when deceleration of the vehicle exceeds a predetermined threshold, means are provided for automatically neutralizing further at least one energizing stage of the speed reducer when the load of the vehicle goes below a predetermined threshold, in a control device according to the three preceding paragraphs in which the number of stages, n, is equal to 4, two of these stages are neutralizable depending on the deceleration of the vehicle and the other two stages are neutralizable depending on the load of the vehicle.

The invention comprises, apart from these main arrangements, certain other arrangements which are preferably used at the same time and which will be more explicitly discussed hereafter.

In what follows, preferred embodiments of the invention will be described with reference to the accompanying drawing. This description is not intended to be limiting.

The single FIGURE of this drawing is a simplified diagram of an electric speed reducer control device in accordance with the invention.

In this figure, a speed reducer 1 is mounted on the drive shaft 2 of a vehicle V such that upon energization of the speed reducer 1 the speed reducer imparts a torque to the drive shaft 2. This torque reduces the velocity of the vehicle V. The vehicle V has front wheels 3 with friction brakes 4 and rear wheels 5 with friction brakes 6.

In a way known per se:
the front brakes 4 are energized through a circuit 7 from a pressurized fluid source 8,
the rear brakes 6 are energized through a circuit 9, independent of circuit 7, from a pressurized fluid source 10, independent of source 8,
and the energization of front brakes 4 and the energization of rear brakes 6 are controlled simultaneously, but independently of each other, by two valves 11, 12 mounted in circuits 7 and 9, respectively. These valves are activated when the driver depresses pedal 13 with his foot.

The pressurized fluid contained in circuits 7 and 9 is advantageously compressed air, but could also be a liquid such as an appropriate oil.

In a way also known per se, energization of speed reducer 1 is ensured in n successive stages (n being a whole number greater than 1 and generally equal to 4), corresponding to n different speed reducing powers.

These n stages may correspond to the successive and cumulative energizations of n identical coil assemblies or to the simultaneous application of the same electric voltage to all the coils, in increasing stages.

The assembly of the coils of the speed reducer, forming the stator thereof, is shown schematically in the figure by rectangle 1, for the sake of clarity. It will be readily understood, however, that this stator forms part of the speed reducer 1, which has been shown symbolically by arrow F.

The n energization stages are controlled respectively by the actuation of n pressure contacts (designated in the figure by the references 14 to 17, n being then assumed equal to 4), calibrated to n different pressures increasing from the first one to the last one and all subjected to the pressure of an appropriate control fluid.

It is known to choose this control fluid so that its pressure increases with the speed reducing needs of the vehicle and so that the value of this pressure successively reaches the n calibration thresholds of the pressure contacts when the brake pedal is depressed through its first half of travel.

As indicated above, in the known embodiments of the control devices based on the above principle, the control fluid considered is that used for remotely controlling the friction braking of one of the wheel trains of the vehicle. Such an arrangement makes the control of the speed reducer vulnerable to damage to the braking circuit of said train. Such damage may be in the the form of leaks.

In order to avoid this constraint, in accordance with the invention, the control of the pressure contacts (14 to 17) is permanently, and simultaneously connected to the pressures reigning in both friction braking circuits 7 and 9, or more exactly to the higher of these two pressures. This connection is to both said pressures if they are equal and to any one of them if the other is cancelled or reduced following damage.

In other words, control of the speed reducer is correctly ensured even if any one of the two circuits controlling the friction braking is defective. The ensuring of control is by virtue of the principle of "the uniqueness of the failure" under which the simultaneous failure of both circuits is practically excluded because of their total independence.

The double control in question is provided by using a dual-control member 18 having two inputs 19 and 20. These inputs are connected to circuits 7 and 9, at points 21 and 22 situated downstream of valves 11 and 12, and an output 23 connected to the different pressure contacts 14 to 17, possibly through a mobile ramp or cam 24.

This member 18 is advantageously a dual-control relay valve of the + + type comprising, besides the two inputs 19 and 20 and output 23, another input 25 connected to a source of pressurized fluid 26 such as compressed air.

This valve 18 is arranged so that the application of two pressures $P_1$ and $P_2$ to its two inputs 19 and 20 results in the application, to its output 23, of a third pressure $P_3$ linked to the highest of the two pressures $P_1$ and $P_2$. This occurs without any communication between the two inputs 19 and 20 (i.e., between the two circuits 7 and 9) nor between any one of these two inputs 19 and 20 and output 23. The pressures $P_1$ and $P_2$ applied to the two inputs 19 and 20 therefore only have a control role in that they regulate the degree of opening of the passage reserved, in valve 18, for the pressurized fluid between input 25 and output 23. This degree of opening being zero as long as the two pressures $P_1$ and $P_2$ maintain their neutral value (for example, equal to the atmospheric pressure) and being greater as the highest of the two pressures $P_1$ and $P_2$ increases.

The relationship existing between pressure $P_3$ and the higher of pressures $P_1$ and $P_2$ is advantageously a constant value "pre-dominance" of the first one over the second one. The constant value of this predominance p is advantageously adjustable, for example between 0 and 1 bar. This allows selective modification of the law of the braking due to the speed reducer with respect to the law of the braking due to the friction brakes. This "predominance" also presents the advantage that the pressure contacts operate with relatively high control pressures, eliminating the use of calibrations which are too low and consequently insufficiently accurate.

Valve 18 is for example the one marketed under the reference 937.002.050 by the WABCO WESTINGHOUSE company.

The operation of the control device described above is set forth in the following paragraphs.

At rest, the friction brakes are released and the electric speed reducer is de-energized. Meanwhile, the pressure in each of the different circuits 7, 9 and 23 is at a minimum and for example, equal to the atmospheric pressure.

For the sake of simplicity, this neutral pressure will be considered in what follows as a "zero" reference pressure and the different pressures which will be discussed are "over-pressures" added to this neutral pressure.

When the driver of the vehicle gradually depresses pedal 13, the pressure in each of the two circuits 7 and 9 increases gradually if these two circuits are in good condition. If one of the two circuits in question is damaged, the pressure which reigns therein does not increase. The pressure in the other circuit then acts alone in the place of the pressure reigning in both circuits, so that the same pressure is supplied to the dual-control type valve 18.

Due to the different play, which occurs at pedal 13 and at the friction brakes, as well as the existence of springs for returning the shoes of these brakes, the friction brakes begin to operate only when the above pressure reaches a certain threshold S. For example, this pressure can be on the order of 0.6 bar, which corresponds to the arrival of the pedal at a given intermediate course of its depressed travel.

The assembly formed by valve 18 and by pressure contacts 14 to 17 is responsive to pressures very much less than this threshold S. Thus, assuming pressure $P_3$ is substantially equal at all times to the highest of the two pressures $P_1$ and $P_2$ (assuming a zero "predominance" p), the first two pressure contacts 14 and 15 may be calibrated to pressure values respectively equal to 0.1 and 0.3 bars.

Therefore, the first two stages of the speed reducer 1 are actuated when the pressure in circuits 7 and 9 respectively exceed the values of 0.1 and 0.3 bar, i.e. before the beginning of the operation of the friction brakes.

The two pressure contacts 16 and 17 may then be respectively calibrated to the threshold S corresponding to the beginning of effective friction braking and to a higher value, for example 1 bar based on the above assumption.

In these circumstances, depressing brake pedal 13 results respectively in the energization of the first stage of the speed reducer, then energization of the second stage, then energization of the third stage at the same time as the beginning of friction braking and finally, by a progressive increase in the power of this friction braking energization of the fourth stage of the speed reducer for an intermediate value of this progression.

Release of the brake pedal then brings about a succession of results which is the reverse of the preceding ones.

It should be noted that, in the above example, the two ranges of deceleration may overlap during control of the braking due to the friction brakes and to the speed reducer, respectively.

This overlapping presents, with respect to the other arrangement of juxtaposed ranges without overlapping, the advantage of making more frequent use of the friction brakes, which improves cleaning thereof. When no overlapping is used, jamming or fouling up of the friction brakes has occurred in some cases because of their infrequent operation.

The "dual" control of the friction brakes and of the speed reducer which has just been described presents a certain number of advantages over the known controls and in particular the following ones:

it is very reliable because of the above mentioned principle of uniqueness of failure, it is accurate and easy to adjust because it depends solely on the pressure existing in any one of the two braking circuits and it is therefore no longer sensitive to modifications to the fitting clearances of the control pedal, it is very easy to adapt to existing vehicles since it requires no modification of the brake pedal, nor of the valves controlled by this pedal, it is very simple to use since it only requires a simple pressure by the driver on the conventional brake pedal.

Since the control of the speed reducer is not ensured independently of the friction brakes but rather is coupled to them while reinforcing the decelerating effects thereof, measures should be taken to prevent the coupled and reinforced control from causing skating or skidding of the vehicle when deceleration is too rapid or when the vehicle load is too low.

For this reason, it is especially advantageous to provide a means for automatically neutralizing at least one stage of the speed reducer when the deceleration of the vehicle exceeds a predetermined threshold D. Additional means may be provided for automatically neutralizing at least one stage of this speed reducer when the load of this vehicle falls below a predetermined threshold C.

In this preferred embodiment, these two safety devices are provided at the same time, one of them being assigned to two of the four stages of the speed reducer and the other one to the two other stages.

This is what has been shown schematically in the figure by the broken-line blocks 27 and 28.

Block 27 designates a member responsive to the deceleration of the vehicle, adapted to neutralize the first two stages of the speed reducer as soon as this deceleration exceeds thresold D, in accordance with the teachings of applicants' French Pat. No. 76 00716 and possibly its first addition No. 79 09098.

In French Patent Application No. 76 00716, an electric or hydraulic decelerator is disengaged when a pulley, connected for rotation on the driven wheels of the vehicle, decelerates too rapidly. A pulse producing device associated with the pulley generates a number of pulses proportional to the speed of rotation of the pulley. The number of pulses during successive identical time periods are then stored in memory devices which generate two potentials proportional to the number of pulses stored in each. The difference between these potentials is determined in a comparator which generates a signal corresponding to this difference. If the signal exceeds a predetermined value, the decelerator is disengaged. The decelerator is again engaged once the signal is below the predetermined valve.

In French Patent Application No. 79 09098, energization of a speed reducer, adapted to brake the axle of a vehicle, is neutralized when deceleration exceeds a predetermined threshold. Neutralization occurs when an electrical switch comprising two conductive wires penetrating into a tube is opened. The tube is sloped downwardly toward the rear of the vehicle and the conductive wires are located at the lower end of the tube so that the wires are electrically connected as long as the vehicle is at rest or decelerates at less than the predetermined threshold.

Block 28 designates a member responsive to the load of the vehicle, adapted to neutralize the last two stages of the speed reducer as soon as this load falls below threshold C.

Of course, thresholds D and C are determined so that the behavior of the vehicle fitted with the dual-control device above satisfies the different regulations during operation of this device, the first of these two thresholds being for example of the order of 1.5 m/s$^2$.

It should be recognized that prior to the present invention, a tractor-trailer unit comprising friction brakes controlled by a pressurized fluid for the front train of the tractor, the rear train of this tractor and the trailer was used. In this unit, the pressure of the fluid, which serves to brake the trailer, was delivered by a valve sensitive to the highest of the two braking pressures corresponding respectively to the front train and the rear train of the tractor. Such an installation was intended to brake the trailer even when one of the two braking circuits of the tractor was defective, but it was concerned solely with the normal and continuous control of the friction brakes of a trailer and not the stepped energization of an electric speed reducer independent of such brakes. Moreover, in this installation, the braking of the rear train of the tractor made use of the control dependent on the load of this train and not the braking of the front train. As a result, failure of the braking circuit of both trains caused respectively different pressure values to be delivered by the valve.

As is evident and as it follows moreover from the above, the invention is not limited to its embodiments and modes of application which have been specifically described; it embraces all variations thereof, particularly:

those where the dual-control valve is of a − + + type instead of being of the + + type indicated above, i.e. comprising a further output for using another output pressure similar to pressure P$_3$ collected at output 23, those where the dual control relay valve is replaced by an assembly of two unidirectional members connected respectively between points 21 and 22 of circuits 7 and 9 and a chamber communicating directly or not with the pressure contacts. These members are adapted to transmit the pressure information which they receive in a single direction, i.e. in the direction of said chamber and not in the reverse direction.

We claim:

1. A system to control energization of a speed reducer mounted on a rotatable drive member of a vehicle such that upon energization, the speed reducer imparts a torque to the drive member which reduces the velocity of the vehicle, said vehicle having a front wheel train and a rear wheel train, each having independent pressurized fluid braking circuits and both being activated by a foot pedal in the vehicle, said system comprises:

a control fluid supply means;

a plurality of pressure contacts adapted to receive said control fluid, said pressure contacts being successively actuated as the pressure of said control fluid increases and being operatively connected to said speed reducer so that when said plurality of pressure contacts are successively actuated, said speed reducer undergoes increased energization intensity;

first and second sensor means positioned for sensing the fluid pressure in the braking circuits of said front wheel train and said rear wheel train, respectively; and pressure adjustment means connecting said control fluid supply and said plurality of pressure contacts and coupled to said first and second sensor means, whereby said pressure adjustment means adjusts the pressure of the control fluid received from the control fluid supply means to a control pressure in response to the higher of the pressures sensed by said first and second sensor means and then supplies the control fluid at the control pressure to said plurality of pressure contacts.

2. A system to control energization of a speed reducer as set forth in claim 1, wherein said pressure adjustment means is designed so that the control pressure has a constant value of predominance over the higher of the pressures sensed by said sensor means.

3. A system to control energization of a speed reducer as set forth in claim 2, wherein said pressure adjustment means is adjustable so that said constant value of predominance can be varied between values of 0 and 1 bar.

4. A system to control energization of a speed reducer, as set forth in claim 1, 2 or 3, wherein said pressure adjustment means is a dual-control relay valve of the ++ type.

5. A system to control energization of a speed reducer, as set forth in claim 4, wherein said speed reducer has a plurality of energization stages corresponding to progressively increasing speed reducing torques, each of said stages being energized as said pressure contacts are successively actuated by an increase in said control pressure.

6. A system to control energization of a speed reducer, as set forth in claim 5, further comprising:
means to automatically neutralize at least one of said energization stages when said vehicle decelerates at a rate exceeding a predetermined value.

7. A system to control energization of a speed reducer, as set forth in claim 6, further comprising:
means for automatically neutralizing at least one of said energization stages when the vehicle has a load below a preset value.

8. A system to control energization of a speed reducer, as set forth in claim 7, wherein there are four energization stages and two of these stages are automatically neutralized when said vehicle decelerates at a rate exceeding a predetermined value, while the other two stages are automatically neutralized when said vehicle has a load below a preset value.

* * * * *